United States Patent [19]

Vollett

[11] 4,295,546
[45] Oct. 20, 1981

[54] TORSIONAL VIBRATION DAMPERS

[75] Inventor: Eric M. Vollett, Huddersfield, England

[73] Assignee: Holset Engineering Company Limited, Huddersfield, England

[21] Appl. No.: 81,192

[22] Filed: Oct. 2, 1979

[51] Int. Cl.³ .............................................. F16F 15/16
[52] U.S. Cl. .................................. 188/378; 188/322.50
[58] Field of Search ......................... 188/1 B; 74/574

[56] References Cited

U.S. PATENT DOCUMENTS

| 2,824,467 | 2/1958 | O'Connor | 74/574 |
|---|---|---|---|
| 2,932,984 | 4/1960 | Murray et al. | 74/574 |
| 3,285,097 | 11/1966 | O'Connor | 74/574 |
| 3,495,475 | 2/1970 | Rumsey | 74/574 |
| 3,552,230 | 1/1971 | McLean | 188/1 B |
| 3,577,802 | 5/1971 | Rumsey | 74/574 |
| 3,678,782 | 7/1972 | Aoki | 188/1 B |
| 4,160,390 | 7/1979 | Spaetgens | 188/1 B |
| 4,173,158 | 11/1979 | Geislinger | 188/1 B |

Primary Examiner—Edward R. Kazenske
Attorney, Agent, or Firm—Gary M. Gron; Robert T. Ruff

[57] ABSTRACT

The disclosure illustrates a tuned viscous torsional vibration damper having a hub member for attachment to an internal combustion engine crankshaft. An annular inertia mass is journaled within the hub member to form a working chamber which contains a viscous liquid to damp out torsional oscillations of the inertia member relative to the hub. The hub has a series of inwardly directed vanes that are received in a corresponding number of slots in the internal member to define pairs of variable chambers filled with viscous liquid. Inwardly directed blind bores in each variable chamber form gas springs which interconnect the hub and inertia member to provide tuning.

9 Claims, 6 Drawing Figures

TORSIONAL VIBRATION DAMPERS

The present invention relates to torsional vibration dampers used for damping the torsional vibrations of internal combustion engine crankshafts and other mass elastic shaft systems.

Various types of torsional vibration dampers are in commom use, the most effective being those known as tuned dampers. Tuned dampers usually comprise an inertia mass resiliently connected to a hub member by metallic or elastomeric tuning spring means, the hub member being adapted for rigid connection to the internal combustion engine crankshaft. The torsional vibration energy imparted to the damper inertia mass by the engine crankshaft during operation is converted into heat energy by damping means in the damper, thereby reducing the vibration amplitudes in the shaft system.

Various means have been employed for converting the vibration energy imparted to the damper inertia mass into heat energy. Where metallic springs have been used to couple the hub member, one common method of achieving the energy conversion has been to utilize the relative movement between the inertia mass and the hub to shear a thin film of viscous fluid, located between the inertia mass and a housing member rigidly attached to the hub member and surrounding the inertia mass in a close shear spaced relationship. Where elastomeric spring means have been used, the damping effect of the internal hysteresis of the elastomeric material has been used to effect the energy conversion. Alternately, the energy conversion has been achieved by use of both hysteresis damping and viscous fluid shear damping in combination.

Various disadvantages are associated with the use of both metallic and elastomeric springs for coupling the inertia mass to the hub member of tuned vibration dampers. Where metallic spring means are used, they must be designed to operate at high stress levels and are subject to fatigue. Where the ends of such springs are freely located in slots or grooves at their points of attachment, they may experience fretting which may result in a reduction in long term durability. Also, frictional effects of the springs contribute to the damping effect of the damper but to an incalculable and varying degree, thereby resulting in an unpredictable damper performance.

A further disadvantage resulting from the use of metallic or elastomeric tuning springs is the difficulty of adjusting them for optimum tuning without costly replacement or modification. This disadvantage is most severe when the tuned damper is large or is required for a single engine or for small quantity application.

The above problems are solved in accordance with the present invention by a tuned viscous torsional vibration damper of the type comprising an annular hub member adapted for attachment to a shaft which, in use, is subject to torsional vibration. An annular inertia mass is journaled for rotation relative to said hub member with at least one surface being in close spaced, face to face relation with at least one opposing surface of said hub member. A viscous fluid is contained between the opposing surfaces in shear relation. The torsionally resilient coupling between the hub member and the inertia mass is provided by a plurality of angularly spaced gas springs connecting the hub member to the inertia mass.

Preferably, the gas springs are arranged to be subjected to periodic compression by way of respective liquid pistons. For this purpose, each gas spring may comprise a pocket of gas disposed at the base of a generally radially inwardly directed blind bore in the inertia mass which contains liquid above the gas pocket. The open end of the bore communicates with an associated liquid chamber whose volume is arranged to be periodically reduced in response to torsional vibration of said shaft to compress the gas pocket via said liquid.

The above and other related features of the present invention will be apparent from a reading of the following description of the disclosure shown in the accompanying drawings and the novelty thereof pointed out in the appended claims.

Figure 1:
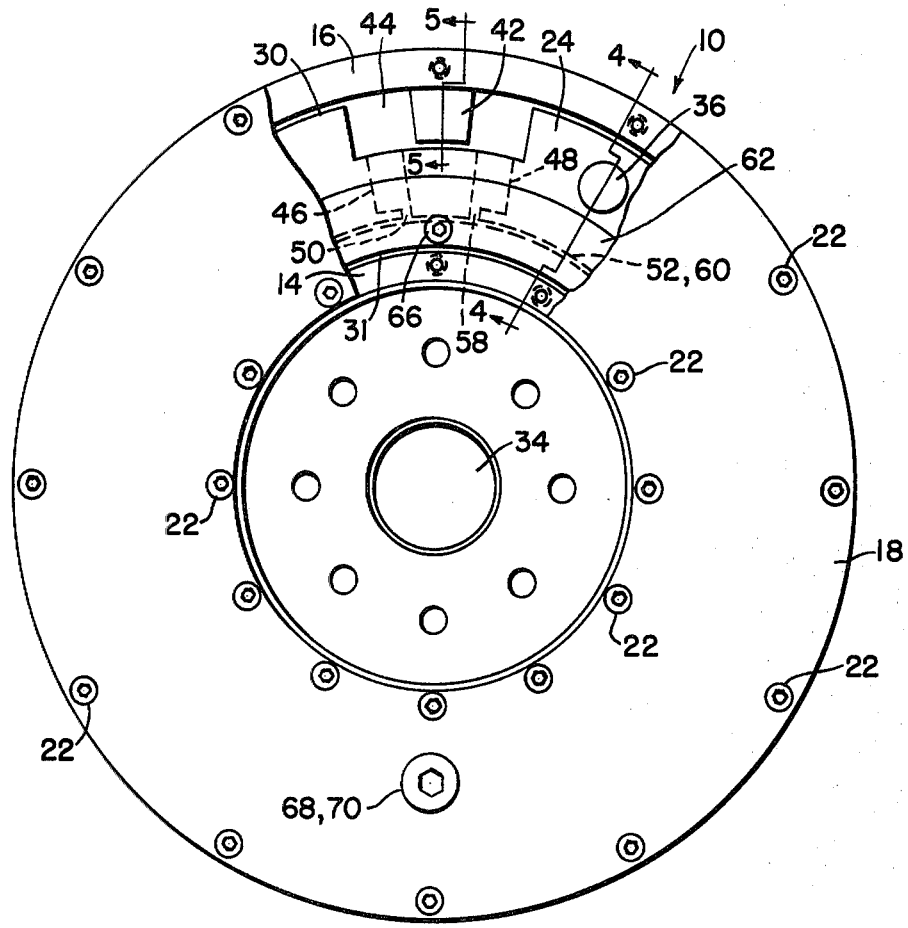
FIG. 1 is a front view, with its front cover plate partially cut away, of a torsional vibration damper in accordance with the present invention.

Referring to FIGS. 1 and 3 the damper has a hub member 10 comprising a metal plate 12 formed with a pair of coaxial inner and outer cylindrical flanges 14,16 respectively which extend normal to the plate 12 and define an open channel therebetween which is closed by an annular plate 18 to define an annular chamber 20 of generally rectangular cross-section. The plate 18 is fitted to the flanges 14,16 in a fluid tight manner by means of a plurality of screws 22. Disposed within the annular chamber 20 is an inertia ring 24 whose side surfaces 26,28 and outer circumferential surface 30 are closely spaced from the adjacent side surfaces 25,27 and circumferential surface 29,31 of the annular chamber 20.

The plate 12 of the hub member 10 has a central opening 34 enabling the damper to be mounted on a shaft (not shown) which, in use, is subject to torsional vibrations. In its industrial application, the damper may be used for damping torsional vibrations of a crankshaft of a reciprocating internal combustion engine.

Figure 4:
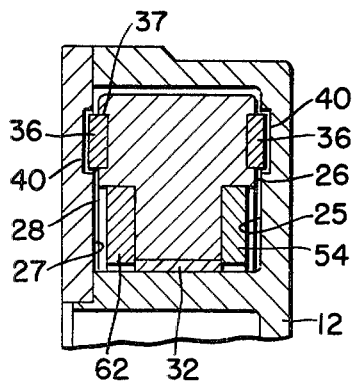
FIG. 4 is a fragmentary sectional view of part of the damper corresponding to a section on the line 4—4 of FIG. 1.

The inertia ring 24 is journaled for rotation relative to the hub member by means of a sleeve 32 of low-friction bearing material, such as polytetrafluro ethylene (p.t.f.e.), disposed between the inner circumferential surface of the inertia ring and surface 31 of the hub flange 14. Axial positioning of the inertia ring 24 within the chamber 20 is achieved by a plurality of disc-like pads 36 (FIGS. 1 and 4) of low-friction material disposed in respective depressions 37 at angularly spaced positions around the side surfaces 26,28 of inertia ring 24. The pads 36 engage in corresponding depressions 40 in the chamber side surfaces 27,25, the dimensions of the later depressions 40 being somewhat greater than the associated pads 36 to enable the inertia ring to be capable of a predetermined angular displacement relative to the hub member as shown. The limits of such displacement are determined in FIG. 4 by engagement of the pads 36 with the side walls of such oversized depressions 40.

Figure 2:
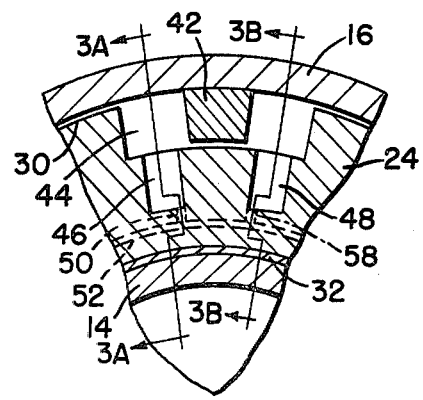
FIG. 2 is a fragmentary cross-sectional view corresponding substantially to the cut-away portion in FIG. 1.

As best seen in the cut-away part of FIG. 1 and in FIG. 2, the inner periphery of the flange 16 of the hub member carries a plurality of radially inwardly extending vanes 42 which project into respective outwardly facing slots 44 in the inertia ring 24 and extend from plate 12 to plate 18. Although only one such pair of vanes and slots is visible in the views provided, a plurality of such vane/slot pairs are uniformly disposed around the hub and inertia ring. As apparent from the drawings, the circumferential length of the slots 44 is considerably greater than the circumferential thickness of the vanes 42. However, the radially inner surface of the vanes is closely spaced from the base of the slots 44, preferably from 0.125 to 1.25 millimeter (0.005 to 0.05 inches). The vanes 42 divide the slots 44 into two chambers, the volume of one chamber varying inversely to that of the other chamber as vanes 42 are displaced circumferentially in the slots 44.

Figure 3A:
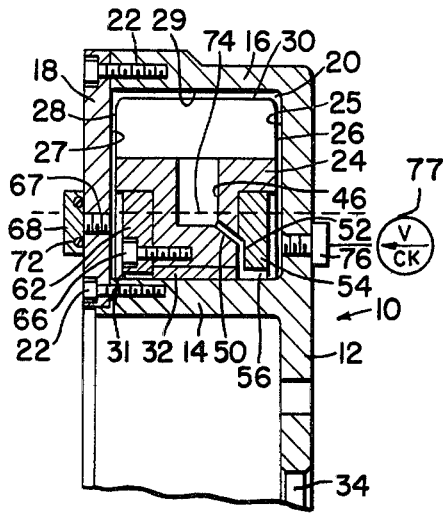
FIG. 3A is a fragmentary sectional side view, the upper half of which corresponds to a section on the line 3A—3A of FIG. 2.
Figure 3B:
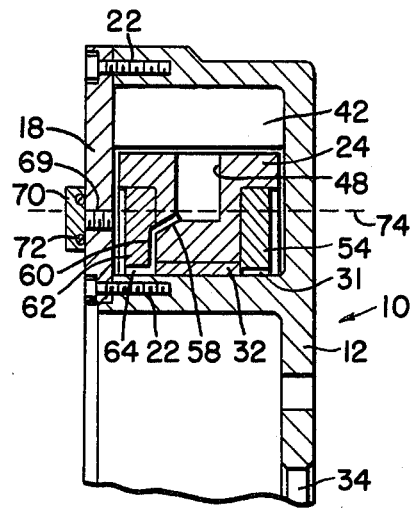
FIG. 3B is a fragmentary sectional side view taken on lines 3B—3B of FIG. 2.

At circumferentially spaced positions in the base of the said slot 44 and disposed symetrically on either side of the associated vane, there are formed radially directed blind bores 46,48 of circular cross section. The bores 46,48 within each slot 44 are positioned alternately with respect to each other around the circumference of the inertia ring. As illustrated in FIG. 3 the radially inner end of each blind bore 46 is linked via a narrow passage 50 to an annular groove 52 formed in a first ring-like side plate 54 mounted on one side of the inertia ring. The annular groove 52 is vented to the radially inner part of the annular chamber 20, which in use acts as a gas reservoir, by means of a constricted vent passage 56 for a purpose explained further hereinafter. Likewise, each blind bore 48 is linked via a narrow passage 58 to an annular groove 60 formed in a second ring-like side plate 62 mounted on the other side of the inertia ring as shown in FIG. 3B. The annular groove 60 is similarly vented to the gas reservoir formed by the radially inner part of the annular chamber 20 by a constricted vent passage 64. The side plates 54,62 can be fixed to the inertia ring by any suitable means, such as by screws 66.

The cover plate 18 is provided with a pair of openings 67,69 which receive screw-threaded plugs 68,70 whose heads contain respective O-ring seals 72, for enabling a predetermined operating level of a viscous liquid (preferably silicone) to be established in the chamber 20. This operating level is indicated in FIGS. 3A and 3B by the broken lines 74. Finally, the chamber 20 has a further screw-threaded plug 76 containing a one-way valve 77 for enabling nitrogen, or other inert gas, within the chamber 20 to be selectably pressurized for the purpose explained below. A typical one-way valve for this purpose is one manufactured by SCHRADER under model number 3047X.

The above described damper operates as follows:

In use, the damper is attached to a shaft, such as an internal combustion engine crankshaft, which, on top of its normal rotation, is subject to torsional vibration. Thus, the hub part of the damper is subjected to repeated angular accelerations in opposite directions in addition to its normal unidirectional rotation. As a result of the viscous coupling between the inertia ring and the hub due to the presence of the viscous liquid in the chamber 20, the inertia ring is carried round with the hub so that, were it not for the torsional vibration, the inertia ring could be considered to be stationary relative to the hub. Thus, the torsional vibration can be considered to cause oscillation of the hub relative to the inertia ring about a central position which is arranged to be that illustrated in FIGS. 1 and 2.

When this oscillation results in rotation of the hub relative to the inertia ring in a counter clockwise direction, as viewed in FIGS. 1 and 2, it will be apparent that the liquid contained in the groove 44 to the left of the blade 42 and the liquid contained in the bore 46 will be forced down the bore 46 to a certain extent by the counter clockwise moving vane 42, which decreases the volume of the chamber to the left of vane 42. At the same time, the liquid in the bore 48 is drawn up the bore due to the increasing volume of the chamber to the right of the vane 42. Thus, the pocket of gas at the base of the bore 46 is subjected to a compressive force during this movement and the pocket of gas at the base of the bore 48 is subjected to a reduced pressure (suction). The same effect occurs at each vane/groove pair around the hub. The liquid to the left of the blade in FIG. 2 thus acts as a liquid piston which compresses the pocket of gas in the bore 46. The pockets of gas therefore serve as an elastic spring coupling between the hub and inertia ring to produce a spring tuning effect which may be used to optimize the performance of the damper.

It will be appreciated that when the hub subsequently moves in the clockwise direction relative to the inertia ring so that the vane 42 moves to the right in FIG. 2, the role of the bores 46 and 48 is reversed, whereby it is the pocket of gas at the base of the bore 48 which is compressed.

The aforegoing explanation assumes that, as a result of the prevailing centrifugal forces, substantially complete separation of the gas and the liquid occurs in the bores 46 and 48. However, it may be that, in fact, this does not occur and that the bores 46,48, and maybe also the groove 44, contain a liquid/gas froth which is constantly being broken down by the centrifugal forces. In this event, the operation of the damper would involve the repeated compression of a froth rather than gas alone as described above.

The provision of the communicating passages 50,52 and 58,60 between the bases of the bores has the result that all of the bores which are "compression bores" at a given instant are connected together and all of the bores which are "suction bores" at that instant are connected together. The provision of the constricted vent passages 56,64 between the communicating passages 52,60 and the air reservoir ensures that a stabilized condition in which the bores contain equal volumes of gas, subjected to equal pressures, is achieved soon after start-up. When the damper 10 is in a stationary position the liquid seeks the lowest level in the damper with a substantial portion of the blind bores and chamber filled with liquid in the lower half of the damper. At the same time, the gas fills the working chambers defined by the slots 44 and vanes 42 for the upper half of the damper. When the damper begins to rotate upon startup of the engine, the liquid is forced radially outward by centrifugal force and then assumes a ring-like level in the radially outward portion of the damper. The vent passages 56 and 64 permit flow of liquid radially outward and flow of gas inward to achieve uniform operating pressures in the bores 46,48.

The vent passages 56,64 are sized such that on a compression stroke the gas flow through the passages and out of the blind bores is inadequate to permit gas pressure in the bores to fall to the gas pressure in the reservoir. Similarly on a suction stroke gas flow through the vent passages is inadequate to permit the gas pressure in the bores to rise to the gas pressure in the reservoir. Vent passages 56,64 having a cross sectional area of from 0.75 to 7.5 square millimeters (0.001 to 0.010 inches$^2$) are preferred for acceptable results.

The correct liquid level in the chamber 20 is obtained by filling the damper with viscous fluid and spinning it that centrifugal force drains the liquid through the level plugs 68 and 70 which are spaced 180 apart at equal radial levels. The effects of thermal expansion of the liquid are minimized by fixing the liquid level for there to be an enclosed air/liquid volume ratio of approximately 1:1, at the working temperature.

The torsional spring rate obtained using this construction is a function of the internal gas pressure within the system and it may be necessary to pressurize the gas within the chamber 20 to obtain optimum tuning. This is achieved by way of the non-return valve 76.

The aforegoing construction provides a number of advantages as follows:

(a) The use of an optimised tuning characteristic results in a lower damper coefficient being required which enables the use of a viscous liquid in the chamber 20 having a lower viscosity and price than with previous devices.

(b) The stiffness of the coupling between the hub and the inertis ring, provided by the compressed gas pockets which act as springs, is readily adjustable by varying the gas pressure within the damper. In previous constructions it has generally been necessary to exchange, modify or vary such expensive components as metallic springs or elastomeric elements.

(c) By eliminating the necessity to provide the expensive components, such as metallic springs or elastomeric elements, referred to in (b) above, the damper can be cheaper and simpler to manufacture.

(d) The performance of the damper is calculable and predictable.

(e) The size of the damper can be readily adapted to meet the requirements of any size of internal combustion engine.

It will be appreciated that the detailed construction of the hub and inertia ring could be different to that described whilst retaining the essential principle of operation.

Figure 5:
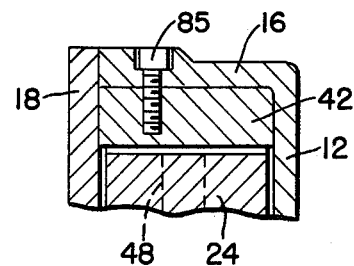
FIG. 5 is a fragmentary sectional view of part of the damper corresponding to a section on the line 5—5 of FIG. 1.

Thus, for example, the chamber 20 need not be formed by the flange parts 14,16 formed integrally with the plate part 12. As shown in FIG. 5 the vanes may be formed separately from other parts of the hub and attached thereto by bolts 85. Alternatively, the vanes could be integral with whatever member forms the outer wall 16 of the chamber.

The sleeve bearing 32 between the inner circumferential surface of the inertia ring 58 and the hub flange 14 may readily be replaced by segmental journal bearing pads located between the outer circumference surface of the inertia ring and the inner circumferential surface of the hub flange 16. Alternatively journal bearing pads may be located between the radially inner circumferential of the vane tips and the bottoms of the slots 44.

While a preferred embodiment of the present invention has been described, it should be apparent that it may be practiced in other than the illustrated form without departing from its spirit and scope.

Having thus described the invention, what is claimed as novel and desired to be secured by Letters patent of the United States is:

1. A torsional vibration damper comprising:
   an annular hub member adapted for connection to a shaft which is subject to torsional vibrations;
   an annular inertia member carried by and journaled for rotation relative to said hub member, at least one surface of the inertia member being in close spaced, face to face relation with at least one opposing surface of said hub member;
   a viscous fluid contained between said opposing surfaces so that relative movement shears the fluid to damp torsional vibrations;
   variable volume chamber means formed between said hub and inertia members comprising a plurality of a pair of first and second variable volume chambers whose volumes vary inversely in response to relative movement of said inertia member and said hub, said viscous liquid being contained within said variable volume chambers during operation of said damper,
   a pocket connected to each of said respective first and second variable volume chambers and being defined by a blind bore, each of said pockets having a gas contained therein which is pressurized by liquid from said chambers when the volume thereof is reduced,
   at least one of said members defining a gas reservoir radially inward from said gas pockets;
   first and second vent passages connecting said gas reservoir to the pockets of said first and second variable volume chambers, respectively, through the other of said members, said vent passages having restricted cross sectional flow areas; and
   a first gas interconnection means connecting the pockets of only said first variable volume chambers and being positioned between said pockets of said first variable volume chambers and one of said first and second vent passages; and a second gas interconnection means connecting the pockets of only said second variable volume chambers and being positioned between said pockets of said second variable volume chambers and the other of said first and second vent passages whereby the gas pockets for each series of variable volume chambers are all interconnected, whereby a tuning effect is provided for said damper.

2. Apparatus as in claim 1 wherein said hub member has an annular chamber therein, said annular inertia member is contained therein and wherein the variable volume chamber means comprises:
   a generally radially extending vane connected to one of said members, the other of said members having an arcuate recess therein receiving said vane, said vane in combination with said arcuate recess defining said pair of variable volume chambers, the volume of one chamber varying inversely to that of the other chamber as the vane is displaced circumferentially relative to the recess.

3. Apparatus as in claim 2 wherein the arcuate recess is formed in said inertia member and the vane is carried by said hub member.

4. Apparatus as in claim 3 wherein said pockets are formed in said inertia members and face radially outward.

5. Apparatus as in claim 1 wherein:
   said gas reservoir is defined by the radially inner portion of the annular chamber in said hub member, and
   said first and second interconnection means and said first and second vent passages comprise first and second ring like plates connected to radially inward annular recess on said inertia member, said plates having a circumference groove in the face thereof which abuts the recess in said inertia elements and a restricted cross section groove extending radially inward therefrom to form said vent pasages, said inertia member having a first set of passageways extending from the pockets for the first variable volume chambers to the groove of said first ring and a second set of passageways extending from the pockets for said second variable volume chambers to the groove of said second ring for providing interconnection between the variable volume chambers.

6. Apparatus as in claim 1 wherein the cross sectional flow area of said vent passages is from 0.75 to 7.5 square millimeters.

7. Apparatus as in claim 1 further comprising a pair of removable plugs in said hub member at equal radial distances from the axis of said hub to permit filling of said damper with sufficient viscous fluid so that it maintains a given annular depth during operation of said damper.

8. Apparatus as in claim 7 further comprising a one way valve for permitting the annular chamber of said hub member to be pressurized with gas to a predetermined pressure level thereby enabling variable tuning for said damper.

9. Apparatus as in claim 2 further comprising a sleeve of low friction bearing material between the inner surface of said annular inertia member and the corresponding surface of said hub member.

* * * * *